United States Patent
Sugahara

(10) Patent No.: US 7,633,603 B2
(45) Date of Patent: Dec. 15, 2009

(54) FLOW VELOCITY DETECTOR AND INK-JET PRINTER

(75) Inventor: Hiroto Sugahara, Aichi-ken (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 0 days.

(21) Appl. No.: 12/341,729

(22) Filed: Dec. 22, 2008

(65) Prior Publication Data

US 2009/0168047 A1    Jul. 2, 2009

(30) Foreign Application Priority Data

Dec. 29, 2007    (JP) .............................. 2007-341563

(51) Int. Cl.
*G01P 3/36* (2006.01)
*G01F 1/00* (2006.01)

(52) U.S. Cl. ........................................ 356/28; 73/861

(58) Field of Classification Search .................. 356/28, 356/28.5; 347/19; 73/202.5, 204.11–204.14, 73/861

See application file for complete search history.

(56) References Cited

U.S. PATENT DOCUMENTS

| 4,727,756 | A | * | 3/1988 | Lew | ........................ | 73/861.24 |
| 6,159,394 | A | | 12/2000 | Akiyama et al. | | |
| 6,280,655 | B1 | | 8/2001 | Xu et al. | | |
| 6,400,449 | B2 | * | 6/2002 | Maris et al. | .................... | 356/72 |
| 7,283,215 | B2 | * | 10/2007 | Wang et al. | .................... | 356/28 |
| 7,299,150 | B1 | | 11/2007 | Sugi et al. | | |

FOREIGN PATENT DOCUMENTS

| JP | 9-229734 | 9/1997 |
| JP | 2000-063824 | 12/1999 |
| JP | 2001-049251 | 2/2001 |
| JP | 2004-170308 | 6/2004 |
| JP | 2004-294147 | 10/2004 |
| JP | 2001-064638 | 3/2007 |
| JP | 2007-298347 | 11/2007 |

* cited by examiner

*Primary Examiner*—Isam Alsomiri
(74) *Attorney, Agent, or Firm*—Reed Smith LLP

(57) ABSTRACT

A flow velocity detector for detecting a flow velocity of a fluid flowing through a flow passage is provided, the flow velocity detector including a flow passage-forming section which defines the flow passage; a stress light-emitting section which is arranged at the flow passage-forming section to receive a stress having a magnitude depending on the flow velocity of the fluid and which emits a light of which amount corresponds to a change of the received stress; and a light-receiving sensor which receives the light emitted by the stress light-emitting section. The flow velocity of the fluid is detected based on an amount of the light received by the light-receiving sensor to generate a detection signal. Accordingly, the structure is simple and small-sized, and the flow velocity of the fluid can be detected at low cost.

14 Claims, 10 Drawing Sheets

FLOW VELOCITY DETECTOR AND INK-JET PRINTER

CROSS REFERENCE TO RELATED APPLICATION

The present application claims priority from Japanese Patent Application No. 2007-341563, filed on Dec. 29, 2007, the disclosure of which is incorporated herein by reference in its entirety.

BACKGROUND OF THE INVENTION

1. Field of the Invention

The present invention relates to a flow velocity detector which detects the flow velocity of a fluid including, for example, liquids, gases, liquid powders (powders), and aerosols and an ink-jet printer which is provided with the flow velocity detector.

2. Description of the Related Art

Conventionally, a flow rate meter (flow velocity meter), which is based on the Pitot tube system, is known as the flow rate meter (flow velocity meter) which measures the flow velocity of a fluid. As an example thereof, a flow rate meter based on the Pitot tube is known, the flow rate meter including a Pitot tube which is arranged in a gas flow of a gas to be measured, a differential pressure detector which detects the differential pressure between the total pressure in a total pressure-detecting tube of the Pitot tube and the static pressure in a static pressure-detecting tube, and a calculating means which calculates the flow velocity of the gas in accordance with a detection output of the differential pressure detector (see Japanese Patent Application Laid-open No. 2004-294147).

An ultrasonic flow rate meter is known as another example of the flow rate meter. As an example thereof, an ultrasonic flow rate meter is known, wherein an ultrasonic wave signal, which is generated by an ultrasonic vibrator disposed on the upstream side of a tube passage, is received by an ultrasonic vibrator disposed on the downstream side, and an ultrasonic wave signal, which is generated by the ultrasonic vibrator disposed on the downstream side, is received by the ultrasonic vibrator disposed on the upstream side. Two pieces of digital data, which are obtained by sampling the signals respectively, are determined, and then the total sum of differences between two signal arrays is determined in a calculating unit while deviating the time axes of the pieces of data. The transmission time difference is determined in CPU on the basis of the point at which the total sum of the differences is minimized to determine the flow velocity of the fluid (see Japanese Patent Application Laid-open No. 2007-298347).

An ultrasonic Doppler flow rate meter is known as still another example of the flow velocity meter. As an example thereof, an ultrasonic Doppler flow rate meter is known, which measures the flow rate of the fluid allowed to naturally flow downwardly in a tube passage in accordance with the following procedure. At first, an ultrasonic wave having a constant frequency is transmitted at an angle of elevation in the flow direction from a transmitting element provided at a central portion of the bottom of the tube passage. An emission wave is received by a receiving element to obtain a beat waveform including the information of a Doppler shift frequency by means of a heterodyne detecting section. Subsequently, the signal except for the noise is allowed to pass by means of a bandpass filter, and the AD conversion is performed by means of an AD converter. After that, a frequency spectrum of the beat waveform is determined by means of a high speed Fourier transformation section. Further, a peak frequency in the frequency spectrum (Doppler shift frequency) is determined by means of a peak detecting section. The average flow velocity and the flow rate are calculated on the basis of the peak frequency by means of a flow rate calculating section. In accordance with the procedure as described above, it is possible to measure the flow rate of the fluid allowed to naturally flow downwardly in the tube passage (see Japanese Patent Application Laid-open No. 9-229734).

However, in the case of the conventional flow rate meter based on the Pitot tube, the ultrasonic flow rate meter, and the ultrasonic Doppler flow rate meter, the structure is complicated and large-sized and the cost is expensive as well. Therefore, it is desired to use a small-sized and low cost flow rate meter, for example, when the flow velocity is measured for the ink allowed to flow through an ink flow passage of an ink-jet printer. However, it is difficult to use the conventional flow rate meter, for example, for the way of use to measure the flow velocity of the ink in an ink-jet printer, because the structure is complicated and large-sized and the cost is expensive as well in the case of the conventional flow rate meter as described above.

SUMMARY OF THE INVENTION

The present invention has been made in order to solve the problems as described above, an object of which is to provide a flow velocity detector which has a simple structure, which is small-sized, and which is provided at low cost, and an ink-jet printer which is provided with the flow velocity detector.

According to a first aspect of the present invention, there is provided a flow velocity detector which detects a flow velocity of a fluid flowing through a flow passage, the flow velocity detector including:

a flow passage-forming section which defines the flow passage;

a stress light-emitting section which is arranged at the flow passage-forming section to receive a stress having a magnitude depending on the flow velocity of the fluid and which emits a light of which amount corresponds to a change caused by the received stress; and a light-receiving sensor which receives the light emitted by the stress light-emitting section, wherein the flow velocity of the fluid is detected based on an amount of the light received by the light-receiving sensor to generate a detection signal.

According to the first aspect of the present invention, when the fluid flows through the flow passage, the stress light-emitting section receives the stress having the magnitude depending on the flow velocity of the fluid. Therefore, the light is emitted at the luminance corresponding to the change of the received stress. The light-receiving sensor is capable of detecting the flow velocity of the fluid by receiving the light emitted by the stress light-emitting section to generate the detection signal. Accordingly, it is possible to detect or sense the fact that the fluid is allowed to flow through the flow passage.

The flow velocity detector according to the present invention may further include a deformation-facilitating structure which is formed on the flow passage-forming section and which is deformable at a magnitude depending on the flow velocity of the fluid, and the deformation-facilitating structure may be provided with the stress light-emitting section.

In this arrangement, when the fluid flows through the flow passage, the deformation-facilitating structure is deformed at the magnitude corresponding to the flow velocity of the fluid.

The stress light-emitting section is deformed in accordance with the deformation of the deformation-facilitating structure to emit the light. The deformation-facilitating structure makes it possible to obtain the relatively large deformation even when the flow velocity of the fluid is relatively small. The relatively large deformation can be applied to the stress light-emitting section. Therefore, it is possible to detect the relatively small flow velocity by means of the flow velocity detector.

In the flow velocity detector according to the present invention, the deformation-facilitating structure may have a protrusion which protrudes into the flow passage, or a thin-walled section or a low rigidity section which is formed in the flow passage-forming section.

In this arrangement, when the protrusion which protrudes into the flow passage or the thin-walled section or the low rigidity section is adopted as the deformation-facilitating structure, the projection, the thin-walled section, or the low rigidity section can be formed to be deformable at the necessary magnitude corresponding to the flow velocity of the fluid allowed to flow through the flow passage. The stress light-emitting section is deformed in accordance with the deformation of the projection or the like. Therefore, the stress light-emitting section is successfully allowed to emit the light at the required luminance.

In the flow velocity detector according to the present invention, a part of the flow passage-forming section, through which the light is transmitted, may be formed of a light-transmissive material such that the light emitted by the stress light-emitting section arrives at the light-receiving sensor.

In this arrangement, when the stress light-emitting section emits the light in accordance with the flow of the fluid through the flow passage, the light can arrive at the light-receiving sensor by being transmitted through the predetermined route formed of the light-transmissive material and/or through the space in some cases. In other words, for example, when the stress light-emitting section is provided at the inside of the flow passage-forming section for forming the flow passage, the route (flow passage-forming section), through which the light is transmitted, is formed of the light-transmissive material so that the light, which is emitted by the stress light-emitting section, arrives at the light-receiving sensor. Accordingly, the light-receiving sensor can receive the light emitted by the stress light-emitting section.

In the flow velocity detector of the present invention, the stress light-emitting section may have a sheet shape, and the stress light-emitting section may be arranged on a surface of the deformation-facilitating structure. In this arrangement, the stress light-emitting section having the sheet shape can be easily formed, for example, by means of the application to the surface of the deformation-facilitating structure. The stress, which is generated by the deformation of the deformation-facilitating structure, can be efficiently transmitted to the stress light-emitting section, because the stress light-emitting section is arranged on the surface of the deformation-facilitating structure. It is possible to improve the sensitivity of the flow velocity detector.

In the flow velocity detector of the present invention, the surface of the deformation-facilitating structure, on which the stress light-emitting section is arranged, may be positioned inside the flow passage. Alternatively, the surface of the deformation-facilitating structure, on which the stress light-emitting section is arranged, may be positioned outside the flow passage. In the case of the former, the stress, which is exerted from the fluid allowed to flow through the flow passage, can be efficiently transmitted to the stress light-emitting section. In the case of the latter, the light, which is emitted from the stress light-emitting section, undergoes no fear of being scattered and/or absorbed, for example, by the fluid flowing through the flow passage. The light can be efficiently introduced into the light-receiving sensor. It is possible to improve the sensitivity of the flow velocity detector.

In the flow velocity detector of the present invention, the stress light-emitting section may be formed integrally with the deformation-facilitating structure. In this arrangement, the stress, which is brought about by the deformation of the deformation-facilitating structure, can be efficiently transmitted to the stress light-emitting section, because the stress light-emitting section is formed integrally with the deformation-facilitating structure. It is possible to improve the sensitivity of the flow velocity detector.

In the flow velocity detector of the present invention, a surface of the stress light-emitting section, which faces the flow passage, may be covered with a reflective layer which reflects the light emitted from the stress light-emitting section. Alternatively, a surface of the stress light-emitting section which faces the flow passage and a surface of the part of the flow passage-forming section which is formed of the light-transmissive material may be covered with a reflective layer which reflects the light emitted from the stress light-emitting section. In these arrangements, the light, which is emitted from the stress light-emitting section, can be efficiently introduced into the light-receiving sensor. It is possible to improve the sensitivity of the flow velocity detector.

In the flow velocity detector of the present invention, a surface of the stress light-emitting section, which faces the flow passage, may be covered with an opaque layer through which the light emitted from the stress light-emitting section is not transmitted. In this arrangement, the fluid is suppressed from being irradiated with the light emitted from the stress light-emitting section. Therefore, there is no fear of any quality change of the fluid which would be otherwise caused by the light.

According to a second aspect of the present invention, there is provided an ink-jet printer including the flow velocity detector concerning the first aspect of the present invention, wherein the fluid is an ink.

According to the second aspect of the present invention, the ink-jet printer is capable of detecting the flow velocity of the ink. Therefore, for example, when the purge operation is performed to discharge the ink from nozzles of an ink-jet head as the maintenance for the ink-jet printer, it is possible to check whether or not the ink is discharged from the nozzles.

In the ink-jet printer of the present invention, the flow passage may be formed as a plurality of flow passages, and the flow passage-forming section may have a plurality of individual flow passage-forming sections each of which defines one of the flow passages; the stress light-emitting section may include a plurality of individual stress light-emitting sections each of which is arranged at one of the individual flow passage-forming sections; the light-receiving sensor may include a single light-receiving sensor; and the flow velocity detector may successively receive lights emitted from the respective individual stress light-emitting sections by the single light-receiving sensor to detect flow velocity of the fluid in each of the flow passages.

According to the flow velocity detector provided for the ink-jet printer, the single light-receiving sensor can be used to successively receive the lights emitted by the plurality of stress light-emitting sections provided for the respective flow passage-forming sections for forming the plurality of fluid flow passages. Accordingly, it is possible to detect the flow velocities of the fluids contained in the respective flow passages. As described above, it is enough to provide one light-receiving sensor. Therefore, it is possible to simplify the structure of the printer, and it is possible to decrease the cost.

The ink-jet printer according to the present invention may further include a movable section which movably supports the plurality of individual flow passage-forming sections having the individual stress light-emitting sections arranged therein, wherein the single light-receiving sensor may be fixed at a predetermined position; and the movable section may be moved so that the lights successively emitted by the plurality of individual stress light-emitting sections are successively received by the single light-receiving sensor and that the flow velocity of the fluid in each of the respective flow passages is detected.

When the flow velocities of the fluids contained in the plurality of flow passages are detected respectively by means of the flow velocity detector, then the movable section is moved, and the lights, which are emitted from the plurality of stress light-emitting sections respectively, can be successively received by the one light-receiving sensor fixed to the fixed section. Accordingly, it is possible to detect the flow velocities of the fluids contained in the respective flow passages. When the movable section is, for example, a carriage on which the ink-jet head based on the serial system is provided, it is unnecessary to provide any exclusive moving mechanism for moving the movable section. Accordingly, it is possible to simplify the structure of the printer, and it is possible to lower the cost.

According to the flow velocity detector concerning the present invention, the following arrangement is provided. That is, the stress light-emitting section, which is provided in the flow passage, receives the stress of the magnitude corresponding to the flow velocity of the fluid. The light is emitted at the luminance corresponding to the change of the received stress. The flow velocity of the fluid is detected by receiving the light by means of the light-receiving sensor. Therefore, the structure is simple and small-sized. It is possible to detect the flow velocity of the fluid at the low cost.

According to the ink-jet printer concerning the present invention, it is possible to detect the flow velocity of the ink. Therefore, for example, when the purge operation is performed to discharge the ink from the nozzles of the ink-jet head, it is possible to check whether or not the ink is discharged from the nozzles. Accordingly, it is possible to avoid any erroneous printing which would be otherwise caused by the fact that the ink is not discharged from the nozzles.

BRIEF DESCRIPTION OF THE DRAWINGS

FIGS. 1A and 1B show a flow velocity detector according to a first embodiment of the present invention, wherein FIG. 1A shows a lateral sectional view illustrating a light-receiving sensor and a first projection provided with a stress light-emitting section allowed to protrude into a first ink flow passage, and FIG. 1B shows a sectional view as viewed from a direction of IB-IB shown in FIG. 1A.

FIGS. 3A and 3B show a flow velocity detector according to a second embodiment of the present invention, wherein FIG. 3A shows a lateral sectional view illustrating a light-receiving sensor and a first light-emitting projection allowed to protrude into a first ink flow passage, and FIG. 3B shows a lateral sectional view illustrating a state in which the ink is allowed to flow as starting from FIG. 3A and the light-receiving sensor receives the light emitted by the first light-emitting projection.

DESCRIPTION OF THE PREFERRED EMBODIMENTS

Figure 8:
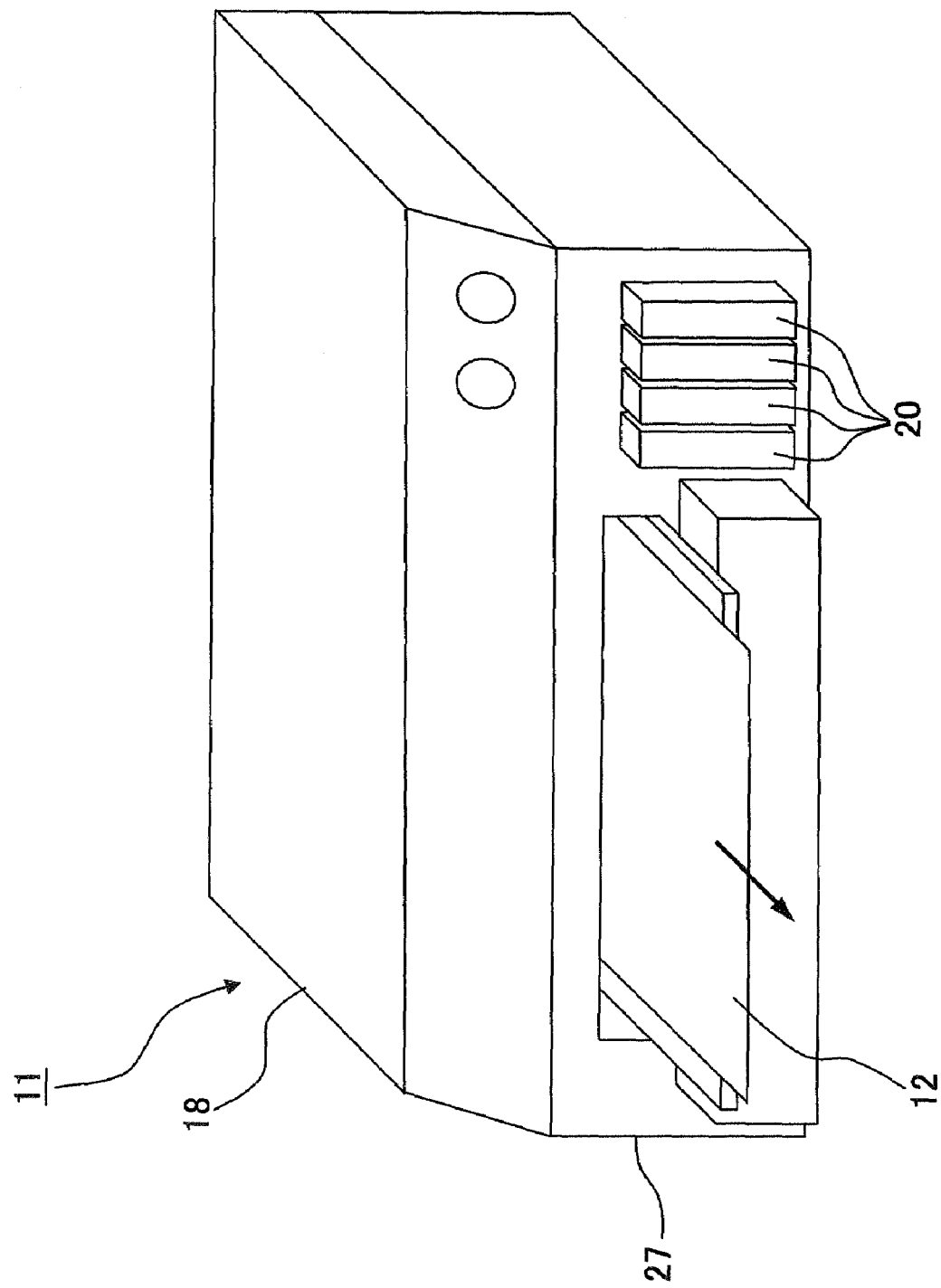
FIG. 8 shows a perspective view illustrating an ink-jet printer provided with the flow velocity detector according to the first embodiment of the present invention.

An explanation will be made below with reference to FIGS. 1, 2, and 8 to 10 about a first embodiment of the flow velocity detector according to the present invention and the ink-jet printer provided with the flow velocity detector. As shown in FIG. 8, an ink-jet printer 11 performs the printing such that inks 15, which are formed into minute droplets, are allowed to blow against a recording medium 12 such as the printing paper. A flow velocity detector 13, which is provided for the ink-jet printer 11, detects the flow velocity brought about when the ink 15 is allowed to flow through each of first to fourth ink flow passages 14a to 14d shown in FIG. 10. The first to fourth ink flow passages 14a to 14d are communicated with a large number of nozzles (not shown) which are provided on the lower surface of a head unit 16 shown in FIG. 9. FIG. 10 shows a magnified plan view illustrating the head unit 16.

The purpose of detecting or sensing the flow velocity of the ink 15 is to check whether or not the ink 15 is discharged from the nozzles, for example, when the purge operation is performed to discharge the ink 15 from the nozzles of the ink-jet head 17 as the maintenance for the ink-jet printer 11.

Figure 9:
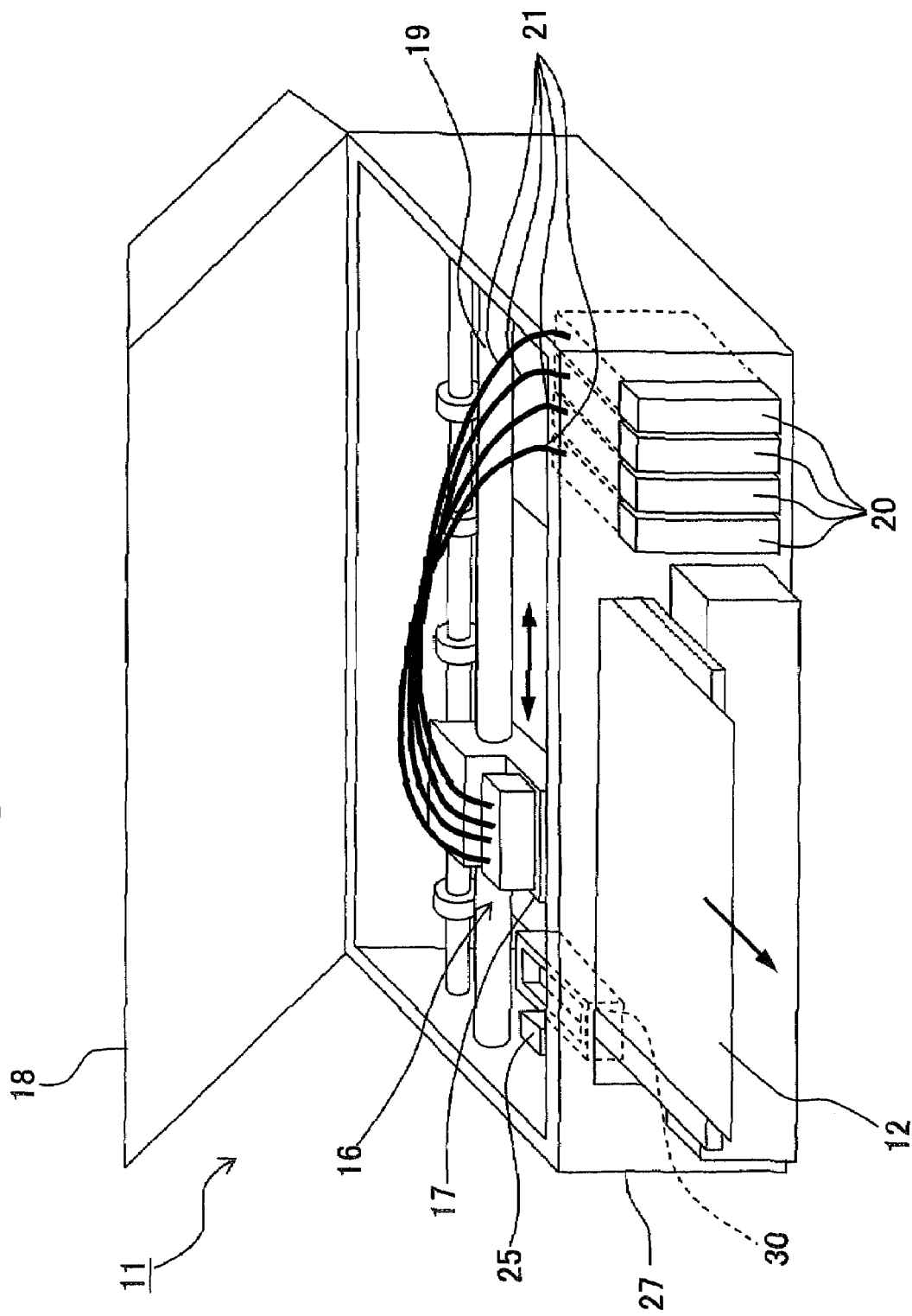
FIG. 9 shows a perspective view illustrating a lid-open state to depict the internal mechanism of the ink-jet printer provided with the flow velocity detector according to the first embodiment of the present invention.
Figure 10:
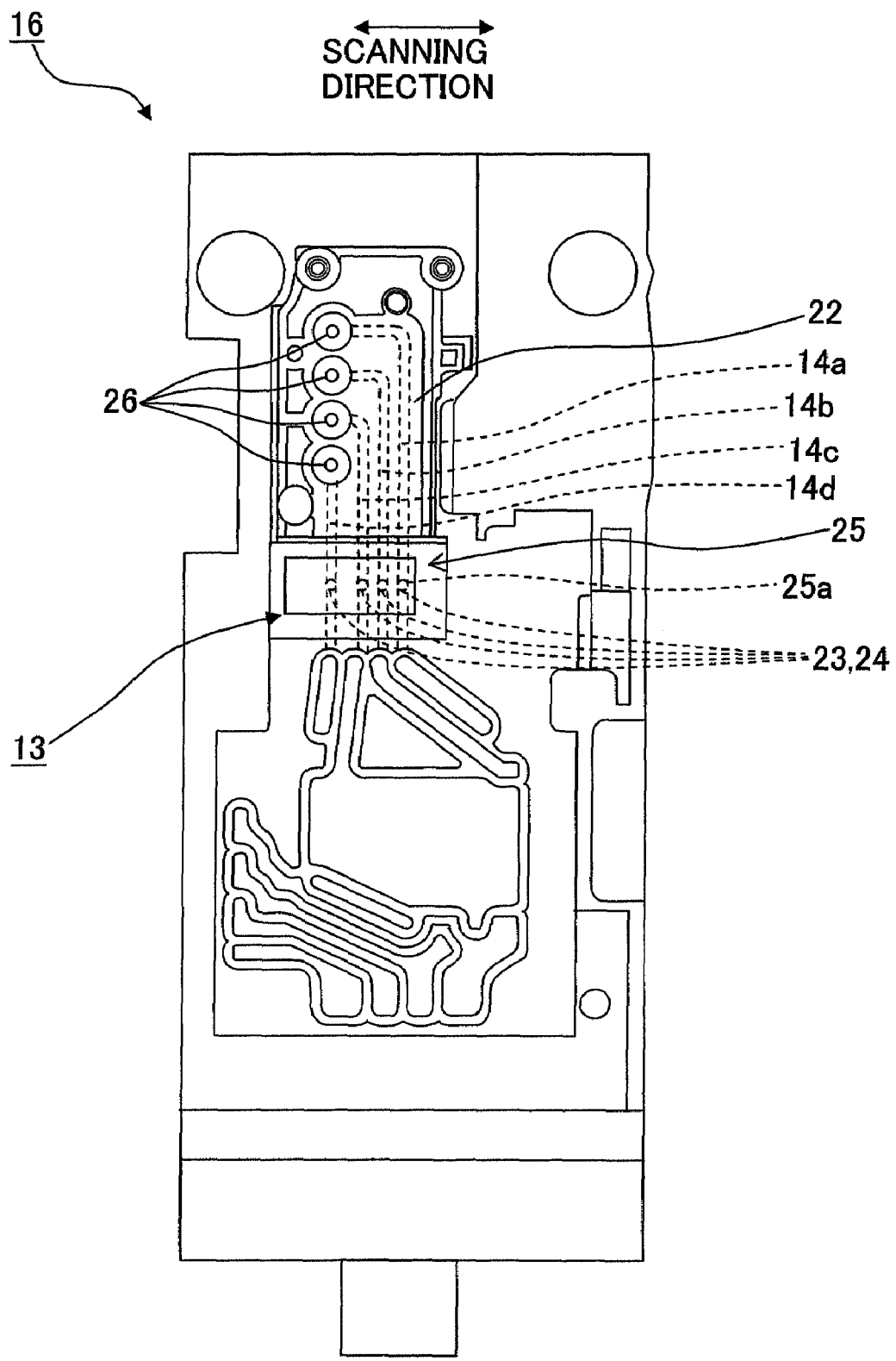
FIG. 10 shows a magnified plan view illustrating a head unit provided for the ink-jet printer according to the first embodiment of the present invention.

FIG. 8 shows a perspective view illustrating the appearance of the ink-jet printer 11, and FIG. 9 shows a perspective view illustrating a state in which a lid member 18 of the ink-jet printer 11 is open.

As shown in FIG. 9, a guide rail 19 is arranged substantially horizontally in the ink-jet printer (liquid droplet discharge apparatus) 11. The head unit 16 is supported by the guide rail 19 by the aid of a carriage (not shown) so that the head unit 16 is slidable in the scanning direction along the guide rail 19. The head unit 16 is connected to a rotary shaft of a motor by the aid of unillustrated pulleys and a timing belt. When the motor is driven and rotated in the forward or reverse direction, the head unit 16 is subjected to the reciprocating scanning along the guide rail 19.

As shown in FIG. 9, four flexible ink supply tubes 21, which supply the four color inks (black, cyan, magenta, and yellow) from four ink cartridges (liquid supply sources) 20 installed to a cartridge installing section respectively, are connected to the head unit 16. Further, an ink-jet head 17 is carried on the head unit 16. The ink-jet head 17 discharges the inks (liquid droplets) 15 from the plurality of nozzles toward the surface of the recording medium 12 such as the printing paper to be transported in the predetermined paper feed direction perpendicular to the scanning direction therebelow.

Figure 1A:
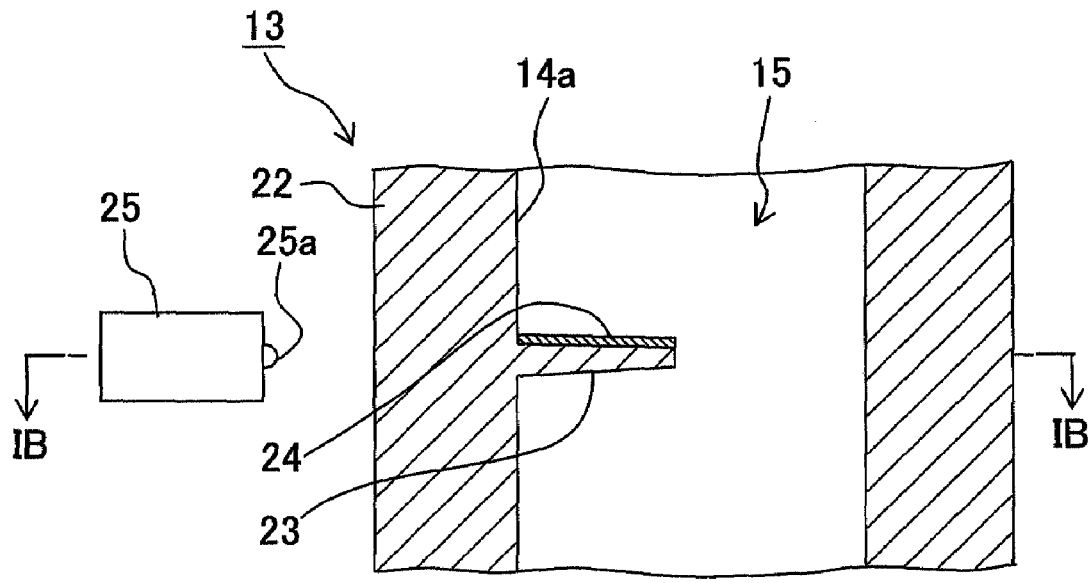

Next, the flow velocity detector 13 will be explained, for example, with reference to FIGS. 1A, 2, 9, and 10. As shown in FIG. 1A, the flow velocity detector 13 includes first to fourth projections 23 each of which serves as a deformation-facilitating structure (a structure which is susceptible to deform) provided to protrude on the inner surface of one of the flow passage-forming sections (individual flow passage-forming sections) 22 for forming one of the first to fourth ink flow passages (individual flow passages) 14a to 14d, stress light-emitting sections (individual stress light-emitting sections) 24 each of which is provided on the surface of one of the first to fourth projections 23, and one light-receiving sensor 25 which receives the light emitted from each of the stress light-emitting sections 24. FIG. 1A shows the first ink flow passage 14a.

As shown in FIG. 10, the first to fourth ink flow passages 14a to 14d are provided on the upper surface portions of the head unit 16. The first to fourth projections 23, which protrude toward the inside of the flow passages respectively, are provided one by one at predetermined positions for the first to fourth ink flow passages 14a to 14d. One end or first end of each of the first to fourth ink flow passages 14a to 14d provided for the head unit 16 is formed as an ink inlet port 26. One end of each of ink supply tubes 21, which corresponds to each of the ink inlet ports 26, is connected to each of the ink inlet ports 26. The other end or second end of each of the first to fourth ink flow passages 14a to 14d is communicated with a plurality of nozzle holes which are provided on the lower surface of the ink-jet head 17 carried on the head unit 16 and which correspond to each of the first to fourth ink flow passages 14a to 14d.

As schematically shown in FIG. 9, the light-receiving sensor 25 is provided fixedly on the inner surface of the side wall of a body 27 of the ink-jet printer 11. When the head unit 16 shown in FIG. 9 is moved to each of the four positions, i.e., the first to fourth maintenance positions disposed at the left end along the guide rail 19, a light-receiving section 25a, which is provided on the lower surface of the light-receiving sensor 25, is positioned at each of the positions disposed over or above each of the first to fourth projections 23 arranged for the four respective first to fourth ink flow passages 14a to 14d as shown in FIG. 10.

In other words, as shown in FIG. 10, when the flow velocity of the ink 15 contained in the first ink flow passage 14a disposed at the right end, the head unit 16 is moved so that the first projection 23, which is arranged in the first ink flow passage 14a, is positioned under or below the light-receiving section 25a of the light-receiving sensor 25. The position of the head unit 16, which is provided in this situation, is referred to as "first maintenance position".

Similarly, when the flow velocity is detected for the ink 15 contained in any one of the second to fourth ink flow passages 14b to 14d provided on the left side of the first maintenance position, the head unit 16 is moved so that corresponding one of the second to fourth projections 23, which is arranged in the one of the second to fourth ink flow passages 14b to 14d, is positioned under or below the light-receiving section 25a of the light-receiving sensor 25. The positions of the head unit 16, which are provided in these situations, are referred to as "second to fourth maintenance positions" respectively (not shown).

The flow passage-forming sections 22, which form the first to fourth ink flow passages 14a to 14d, are formed of a synthetic resin having the light-transmissive property. Therefore, the lights, which are emitted from the stress light-emitting sections 24 provided on the surfaces of the first to fourth projections 23 arranged in the first to fourth ink flow passages 14a to 14d respectively, are capable of arriving at the light-receiving sensor 25.

The first to fourth ink flow passages 14a to 14d shown in FIG. 10 are equivalent components, and the first to fourth projections 23 provided with the stress light-emitting sections 24 arranged in the first to fourth ink flow passages 14a to 14d respectively are also equivalent components. The following explanation will be made about the first ink flow passage 14a and the first projection 23 provided with the stress light-emitting section 24. Any explanation will be omitted about the second to fourth ink flow passages 14b to 14d and the second to fourth projections 23 provided with the stress light-emitting sections 24.

Figure 1B:
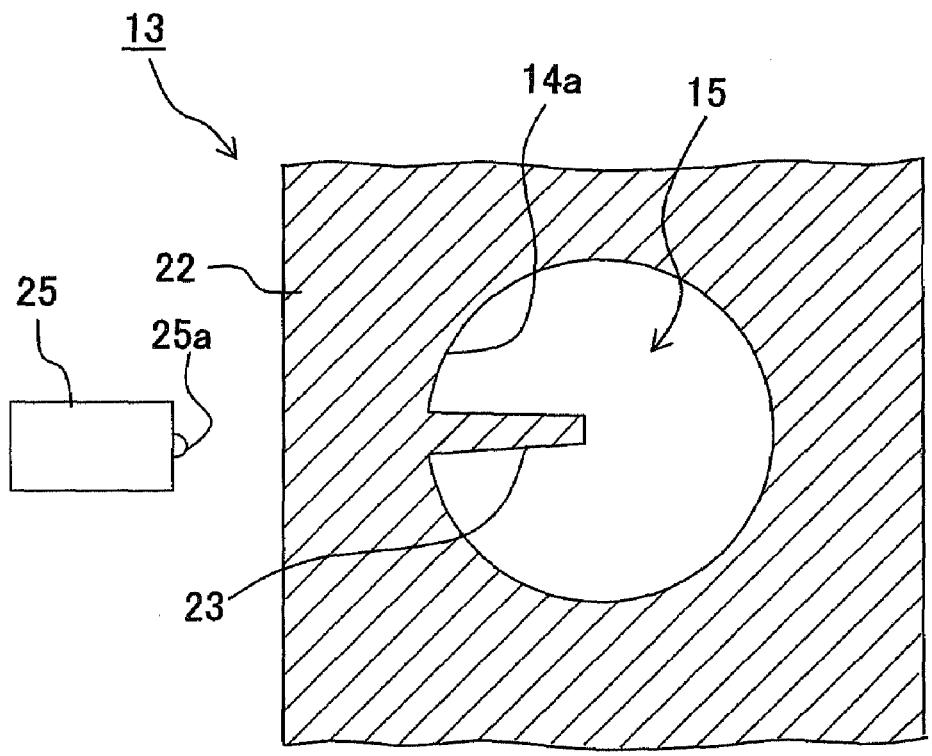

FIG. 1A shows a sectional view as obtained when the flow passage-forming section 22 for forming the first ink flow passage 14a is cut in the direction parallel to the flow passage direction. FIG. 1B shows a vertical sectional view illustrating the flow passage-forming section 22 provided with the first projection 23 shown in FIG. 1A.

As shown in FIG. 1B, the first ink flow passage 14a has a circular vertical cross-sectional shape, which is formed by the flow passage-forming section 22.

The first projection 23 is the deformation-facilitating structure. The deformation-facilitating structure herein means a structure which is greatly deformed when the stress is applied. When the force, which is brought about by the flow of the ink, is applied to the first projection 23 as described later on, the first projection 23 is deformed so that the first projection 23 is flexibly warped or bent to a great extent in the direction of the flow of the ink. As shown in FIGS. 1A and 1B, the first projection 23 is formed to have a cantilever support structure on the inner surface of the cylindrical flow passage-forming section 22 which forms the first ink flow passage 14a. The first projection 23 is formed to have a length extending from the portion which is closest to the light-receiving sensor 25 to the position which is slightly short of the central position of the first ink flow passage 14a.

As shown in FIGS. 1A and 1B, the first projection 23 is a substantially trapezoidal shaped plate member which is tapered at positions nearer to the forward end. The plate surface thereof is perpendicular to the extending direction of the first ink flow passage 14a (see FIG. 1B). As shown in FIG. 1A, the thickness of the first projection 23 is also tapered at positions nearer to the forward end. In other words, the first projection 23 has a proximal end portion 123a which is joined to the wall surface of the first ink flow passage 14a, and an extending portion 123b which extends toward the inside of the first ink flow passage 14a in the plane perpendicular to the flow direction of the ink in the first ink flow passage 14a from the proximal end portion 123a. The thickness (length in the direction of the flow of the ink) and the width of the extending portion 123b are smaller than the thickness and the width of the proximal end portion 123a, respectively. As described above, the first projection 23 is arranged so that the plate surface is perpendicular to the direction of the first ink flow passage 14a. Therefore, the first projection 23 behaves as the resistance to the flow of the ink 15 in the first ink flow passage 14a to provide a relatively large flexure or warpage. The reason, why the first projection 23 behaves as the resistance to the flow of the ink 15 to provide the relatively large flexure, is that it is intended to apply a relatively large stress to the stress light-emitting section 24 provided on the plate surface of the first projection 23 so that the luminance (intensity) of the light emitted by the stress light-emitting section 24 is increased.

As shown in FIG. 1A, the stress light-emitting section 24 is secured to the plate surface of the first projection 23, for example, by means of the application or coating to provide a predetermined thickness. The plate surface of the first projection 23, to which the stress light-emitting section 24 is secured, is the surface disposed on the side on which the ink 15 allowed to flow through the first ink flow passage 14a is allowed to collide therewith.

Figure 2:
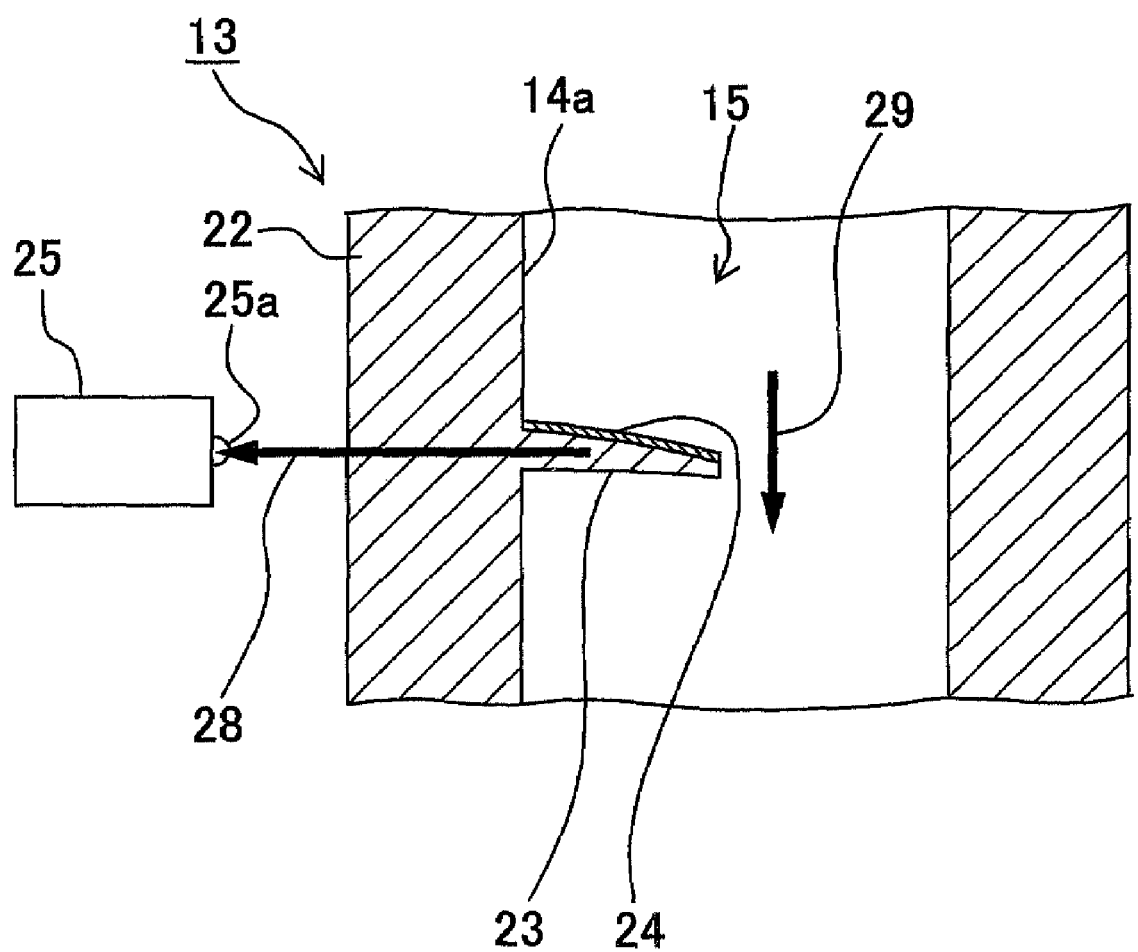
FIG. 2 shows a lateral sectional view illustrating a state in which the ink is allowed to flow as starting from FIG. 1A and the light-receiving sensor receives the light emitted by the stress light-emitting section.

When the first projection 23, which is provided with the stress light-emitting section 24, is used, as shown in FIG. 2, the first projection 23 is warped and deformed in the flow direction of the ink 15 at a magnitude corresponding to the flow velocity of the ink 15. When the first projection 23 is warped and deformed as described above, then the stress light-emitting section 24 receives the stress of the magnitude corresponding to the flow velocity of the ink 15, and the stress light-emitting section 24 emits the light at a luminance (intensity) corresponding to the change of the received stress. Strictly speaking, the luminance of the stress light-emitting section 24 is changed in correlation with the amount of change of the stress per unit time (stress velocity). In other words, in order to allow the stress light-emitting section 24 to emit the light at the high luminance, it is appropriate that the magnitude of the stress applied to the stress light-emitting section 24 is greatly changed in a short period of time. The arrow 28 shown in FIG. 2 indicates the light emitted by the stress light-emitting section 24. The arrow 29 indicates the flow direction of the ink 15.

As shown in FIG. 2, the light 28, which is emitted by the stress light-emitting section 24 provided on the surface of the first projection 23 arranged in the first ink flow passage 14a, is transmitted through the flow passage-forming section 22 having the light-transmissive property, and the light 28 is received by the light-receiving sensor 25.

Similarly, although not shown, the light, which is emitted by each of the stress light-emitting sections 24 provided on the surfaces of the second to fourth projections 23 arranged in the second to fourth ink flow passages 14a to 14d respectively, is transmitted through each of the flow passage-forming sections 22 having the light-transmissive property at each of different timings, and the light 23 is received by the light-receiving sensor 25. In other words, the head unit 16 is successively moved from the first maintenance position to the second, third, and fourth maintenance positions, and thus the flow velocities of the inks 15 contained in the first to fourth ink flow passages 14a to 14d can be detected or sensed by using one light-receiving sensor 25.

The ink-jet printer 11 further includes a calculation control section (not shown). The calculation control section includes, for example, a central processing unit (CPU), which functions as a judging section as described later on. The light-receiving sensor 25 is electrically connected to the calculation control section.

The judging section judges whether or not the light-receiving sensor 25 outputs the detection signal. The light-receiving sensor 25 outputs the detection signal when the light-receiving sensor 25 receives the light 28 of not less than the predetermined luminance (intensity) emitted by each of the stress light-emitting sections 24 provided on each of the surfaces of the first to fourth projections 23.

In this arrangement, when the luminance (intensity) of the light 28 emitted by a certain stress light-emitting section 24 is not less than the predetermined value, i.e., when the judging section judges that the light-receiving sensor 25 outputs the detection signal, then the judging section is capable of judging that the ink 15 of not less than a prescribed amount is discharged from the nozzle holes communicated with the ink flow passage in which the concerning stress light-emitting section 24 is arranged. In this situation, for example, the judging section is capable of judging that the purge operation is normal in relation to the concerning ink flow passage.

However, when the luminance (intensity) of the light 28 emitted by a certain stress light-emitting section 24 is less than the predetermined value, i.e., when the judging section judges that the light-receiving sensor 25 does not output the detection signal, then the judging section is capable of judging that the ink 15 of not less than the prescribed amount is not discharged from the nozzle holes communicated with the ink flow passage in which the concerning stress light-emitting section 24 is arranged. In this situation, for example, the judging section is capable of judging that the purge operation is abnormal in relation to the concerning ink flow passage.

Next, the stress light-emitting section 24 will be explained. The stress light-emitting section 24 is, for example, a substance obtained by adding europium (Eu) (rare earth substance) as the light emission center to $Sr_3Al_2O_6$ (aluminic acid salt) as the base material, or a material obtained by adding neodymium (Nd) (transition metal substance) as the light emission center to $Ca_3Al_2O_6$ (aluminic acid salt) as the base material. More specifically, the stress light-emitting material can be prepared by adding 0.6 wt % Eu as the light emission center and 1 wt % boric acid as the flux to $Sr_3Al_2O_6$ as the base material, followed by being sintered at 1300° C. for about 4 hours in a reducing atmosphere ($Ar+H_2$ 5%). The obtained product can be utilized by converting it into a powder.

Other than the above, those usable as the stress light-emitting material include, for example, $Sr_{0.90}Al_2O_{3.90}$: $Eu_{0.01}$ (see Japanese Patent Application Laid-open No. 2000-63824), $Ca_2Al_2SiO_7$: Ce, $Ca_2MgSi_2O_7$: Ce (see Japanese Patent Application Laid-open No. 2001-49251), and $ZnAl_2O_4$: Mn, $BaAl_2O_4$: Ce (see Japanese Patent Application Laid-open No. 2001-64638).

As shown in FIG. 1A, when the stress light-emitting section 24 is provided on the plate surface of the first projection 23 (and the second to fourth projections 23), then the powder of the stress light-emitting material is mixed with an adhesive of, for example, the epoxy system having the light-transmissive property to prepare a paste, and the paste is applied to have a predetermined thickness onto the plate surface of the first projection 23 (and the second to fourth projections 23). In this way, the stress light-emitting section 24 is provided on the plate surface of the first projection 23 (and the second to fourth projections 23).

Next, an explanation will be made about a procedure to detect the flow velocity of the ink 15 contained in each of the first to fourth ink flow passages 14a to 14d provided in the head unit 16 shown in FIG. 10, by using the ink-jet printer 11 provided with the flow velocity detector 13 constructed as described above. The purpose of detecting the flow velocity of the ink 15 contained in each of the first to fourth ink flow passages 14a to 14d as described above is to check whether or not the ink 15 is discharged from the nozzles, for example, when the purge operation is performed to discharge the ink 15 from the nozzles of the ink-jet head 17 during the maintenance for the ink-jet printer 11.

At first, when the operator makes the purge operation instruction by operating an operation switch provided for the ink-jet printer 11, as shown in FIG. 10, the calculation control section controls the head unit 16 to move to the first maintenance position. Accordingly, it is possible to detect the flow velocity of the ink 15 contained in the first ink flow passage 14a disposed at the right end. In this situation, the first projection 23, which is arranged in the first ink flow passage 14a and which is provided with the stress light-emitting section 24, is positioned under or below the light-receiving section 25a of the light-receiving sensor 25. The calculation control section performs the purge operation to discharge the inks 15, for example, from the plurality of nozzles of the ink-jet head 17 communicated with the first to fourth ink flow passages 14a to 14d respectively.

In this situation, when the ink 15 contained in the first ink flow passage 14a is discharged from the nozzles and the ink 15 is allowed to flow through the first ink flow passage 14a, then the first projection 23 is deformed in an amount of deformation corresponding to the flow velocity of the ink 15, and the stress light-emitting section 24 is deformed to emit the light in accordance with the deformation of the first projection 23. The light-receiving sensor 25 is capable of receiving the light 28 emitted by the stress light-emitting section 24.

When it is judged that the luminance (intensity) of the light 28 emitted by the stress light-emitting section 24 provided on the first projection 23 is not less than the predetermined value, i.e., when the judging section of the calculation control section judges that the light-receiving sensor 25 outputs the detection signal, then the judging section can judge that the ink 15 of not less than the prescribed amount is discharged from the nozzle holes communicated with the first ink flow passage 14a in which the concerning stress light-emitting section 24 is arranged. In this situation, for example, the judging section can judge that the purge operation is normal in relation to the first ink flow passage 14a, and this fact can be displayed on a display section (not shown).

However, when it is judged that the luminance (intensity) of the light emitted by the stress light-emitting section 24 provided on the first projection 23 is less than the predetermined value, i.e., when the judging section of the calculation control section judges that the light-receiving sensor 25 does not output the detection signal, then the judging section can judge that the ink 15 of not less than the prescribed amount is not discharged from the nozzle holes communicated with the first ink flow passage 14a in which the concerning stress light-emitting section 24 is arranged. In this situation, for example, the judging section can judge that the purge operation is abnormal in relation to the first ink flow passage 14a, and this fact can be displayed on the display section (not shown).

Similarly, when the flow velocities of the inks 15 contained in the second to fourth ink flow passages 14b to 14d successively provided on the left side of the first ink flow passage 14a shown in FIG. 10 are detected, the head unit 16 is successively moved at the predetermined timings to the second to fourth maintenance positions. In this situation, each of the second to fourth projections 23, which is arranged in each of the second to fourth ink flow passages 14b to 14d, is positioned under or below the light-receiving section 25a of the light-receiving sensor 25 at the predetermined timing.

In the same manner as described above, when each of the second to fourth projections 23 is moved to the position under or below the light-receiving section 25a of the light-receiving sensor 25 at the predetermined timing, then the judging section of the calculation control section judges whether or not the luminance (intensity) of the light 28 emitted by each of the stress light-emitting sections 24 provided for the second to fourth projections 23 is not less than the predetermined value, i.e., whether or not the light-receiving sensor 25 outputs the detection signal. Further, the judging section judges whether the purge operation is normal or abnormal in relation to each of the second to fourth ink flow passages 14b to 14d, and this fact is displayed on the display section (not shown).

In case the luminance (intensity) of the light emitted by the stress light-emitting section 24 is less than the predetermined value, i.e., in case the judging section judges that the light-receiving sensor 25 does not output the detection signal, even when the purge operation is performed, for example, for the predetermined period of time as described above, then it is found that the flow velocity of the ink is lowered in the ink flow passage. The cause of the decrease in the ink flow velocity includes, for example, the increase in the flow resistance of the ink contained in the ink flow passage due to the drying and/or the increase in viscosity of the ink 15 and the clog-up of the filter due to any foreign matter. In such a situation, this fact can be displayed on the display section and/or the operator can be informed of this fact in order to perform any process for removing each of the causes.

A purge cap 30 is shown in FIG. 10. The purge cap 30 makes tight contact with the nozzle forming surface of the head unit 16, when the head unit 16 is moved to each of the first to fourth maintenance positions to perform the purge operation. In this situation, the inks 15 contained in the head unit 16 can be forcibly discharged from the plurality of respective nozzles by lowering the pressure in the purge cap by means of an unillustrated pump.

As described above, as shown in FIGS. 1A and 1B, the stress light-emitting sections 24 of the flow velocity detector 13 are arranged in the first to fourth ink flow passages 14a to 14d, respectively. When each of the stress light-emitting sections 24, which is provided on each of the first to fourth projections 23, receives the stress of the magnitude corresponding to the flow velocity of the ink 15, the stress light-emitting section 24 emits the light at the luminance corresponding to the change of the received stress. The flow velocity detector 13 detects the flow velocity of the ink 15 such that the light 28, which is emitted from the stress light-emitting section 24, is received by the light-receiving sensor 25. Therefore, the structure of the flow velocity detector 13 can be simplified and small-sized. It is possible to detect the flow velocity of the ink 15 at the low cost.

When the flow velocity detector 13 is applied to the ink-jet printer 11, it is possible to check whether or not the ink 15 is discharged from the nozzles, for example, when the purge operation is performed to discharge the ink 15 from the nozzles of the ink-jet head 17. Accordingly, it is possible to avoid any erroneous printing which would be otherwise caused by the failure of the discharge of the ink 15 from the nozzles.

In the flow velocity detector 13 shown in FIGS. 1A and 1B, each of the first to fourth projections 23, which serves as the deformation-facilitating structure that is deformable at the magnitude corresponding to the flow velocity of the ink 15 allowed to flow through each of the ink flow passages, is provided for each of the flow passage-forming sections 22 of the first to fourth ink flow passages 14a to 14d. The stress light-emitting section 24 is provided for each of the first to fourth projections 23. Therefore, even when the flow velocity of the ink 15 is relatively small, the relatively large deformation is applied to the stress light-emitting section 24 owing to each of the first to fourth projections 23 as the deformation-facilitating structure. Therefore, it is possible to detect the relatively small flow velocity by means of the flow velocity detector 13.

As shown in FIGS. 1A and 1B, each of the first to fourth projections 23 allowed to protrude into the first to fourth ink flow passages 14a to 14d is formed as the deformation-facilitating structure. In this arrangement, each of the first to fourth projections 23 can be formed to be deformable at the necessary magnitude corresponding to the flow velocity of the ink 15 allowed to flow through each of the first to fourth ink flow passages 14a to 14d by adjusting, for example, the thickness, the length, the shape, the material, and the protruding angle of each of the first to fourth projections 23. The stress light-emitting sections 24 are deformed in accordance with the deformation of the first to fourth projections 23. Therefore, when the first to fourth projections 23, which serve as the deformation-facilitating structures, are allowed to have the structures which are deformable with ease as described above, it is possible to allow the stress light-emitting sections 24 to emit the lights at the necessary luminance.

As shown in FIG. 2, when the stress light-emitting section 24 emits the light as the ink 15 is allowed to flow through each of the first to fourth ink flow passages 14a to 14d, the light 28 arrives at the light-receiving sensor 25 by being transmitted through the space and the predetermined route of the flow passage-forming section 22 formed of the light-transmissive material. In other words, when the stress light-emitting section 24 is provided at the inside of the flow passage-forming section 22 for forming each of the first to fourth ink flow passages 14a to 14d, the predetermined route of the flow passage-forming section 22, through which the light 28 is transmitted, is formed of the light-transmissive material so that the light 28, which is emitted by the stress light-emitting section 24, arrives at the light-receiving sensor 25. Accordingly, the light 28, which is emitted by the stress light-emitting section 24, can be received by the light-receiving sensor 25.

According to the flow velocity detector 13 provided for the ink-jet printer 11 shown in FIGS. 1, 2, 9, and 10, one light-receiving sensor 25 can be used to successively receive the lights 28 emitted by the four stress light-emitting sections 24 arranged in the flow passage-forming sections 22 for forming the first to fourth ink flow passages 14a to 14d. Accordingly, it is possible to detect the flow velocities of the inks 15 contained in the first to fourth ink flow passages 14a to 14d respectively. As described above, it is enough to provide one light-receiving sensor 25. Therefore, it is possible to simplify the structure of the printer 11, and it is possible to decrease the cost.

When the flow velocities of the inks 15 contained in the plurality of first to fourth ink flow passages 14a to 14d are detected respectively by means of the flow velocity detector 13 provided for the ink-jet printer 11 shown in FIGS. 1, 2, 9, and 10, then the movable head unit 16 is moved to the first to fourth maintenance positions, in sequence, and the lights 28, which are emitted from the four stress light-emitting sections 24, are successively received by one light-receiving sensor 25 fixed to the main body 27 (casing 27). Accordingly, it is possible to detect the flow velocities of the inks 15 contained in the first to fourth ink flow passages 14a to 14d respectively. The head unit 16 is provided for the ink-jet printer 11 based on the serial system shown in FIG. 9. The ink-jet printer 11 based on the serial system has a moving mechanism for moving the head unit 16 in order to perform the printing. Therefore, the moving mechanism can be utilized in order to move the first to fourth ink flow passages 14a to 14d (head unit 16) to the first to fourth maintenance positions. In other words, it is unnecessary to provide any exclusive moving mechanism for moving, to the first to fourth maintenance positions, the first to fourth ink flow passages 14a to 14d (head unit 16) arranged with the first to fourth projections 23. Accordingly, it is possible to simplify the structure of the printer 11, and it is possible to lower the cost.

In the first embodiment described above, the plate surface of the first projection 23, to which the stress light-emitting section 24 is secured, is the surface disposed on the side on which the ink 15 flowing through the first ink flow passage 14a is allowed to collide therewith. However, the stress light-emitting section 24 may be secured to the plate surface disposed on the side opposite to the surface with which the ink 15 is allowed to collide. In this arrangement, the response of the deformation of the stress light-emitting section 24 is somewhat deteriorated. However, the dust, which is contained in the ink 15, hardly makes contact with the stress light-emitting section 24. Therefore, the stress light-emitting section 24 can be prevented from being damaged.

Second Embodiment

Figure 3A:
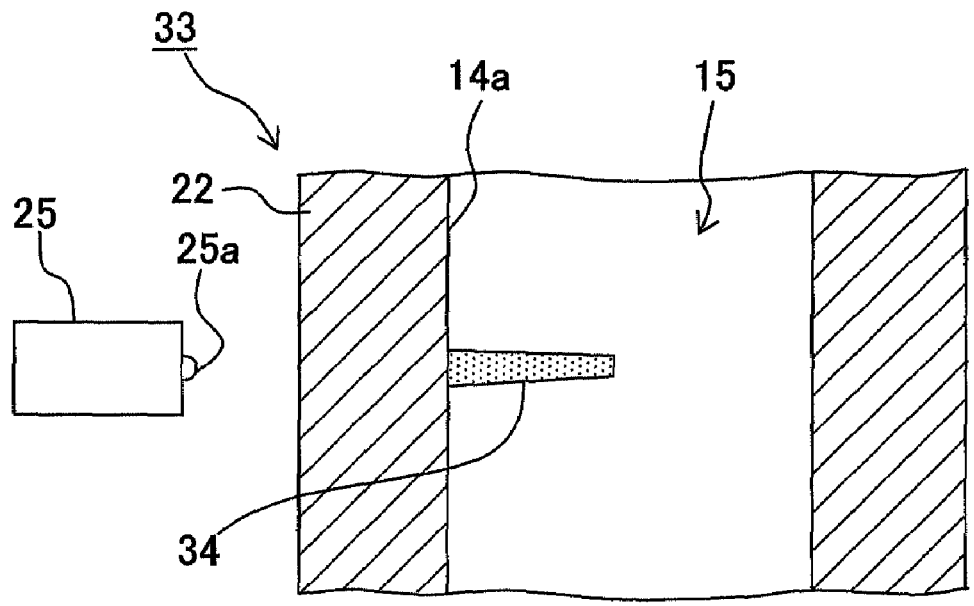
Figure 3B:
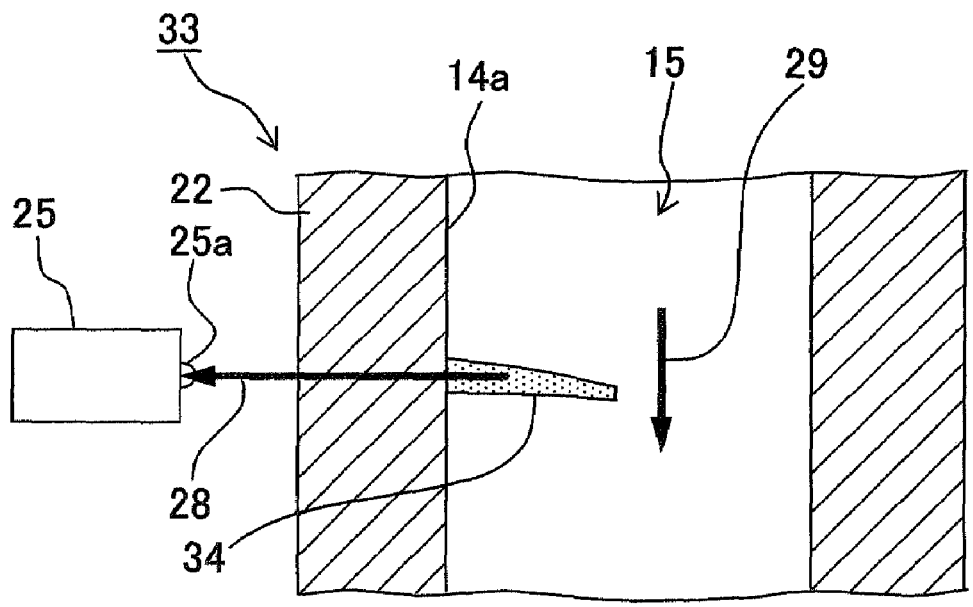

Next, an explanation will be made with reference to FIGS. 3A and 3B about a flow velocity detector 33 of a second embodiment of the present invention and an ink-jet printer 11 provided with the flow velocity detector 33. The flow velocity detector 33 of the second embodiment shown in FIGS. 3A and 3B is different from the flow velocity detector 13 of the first embodiment shown in FIGS. 1, 2, and 8 to 10 with respect to the following points. That is, in the first embodiment, the stress light-emitting sections 24 with the predetermined thickness are provided on the respective plate surfaces of the first to fourth projections 23 (only the first projection 23 is shown) in the flow velocity detector 13 shown, for example, in FIG. 1. On the other hand, in the second embodiment, first to fourth light-emitting projections 34 (only the first light-emitting projection 34 is shown) are provided in place of the first to fourth projections 23 and the stress light-emitting sections 24 in the flow velocity detector 33 of the second embodiment shown in FIGS. 3A and 3B.

The first to fourth light-emitting projections 34 are formed by mixing and dispersing a powder of the stress light-emitting material in a light-transmissive synthetic resin material. In other words, the first to fourth light-emitting projections 34 themselves are the stress light-emitting sections, and the stress light-emitting sections are formed as the deformation-facilitating structures.

The first to fourth light-emitting projections 34 are formed by mixing and dispersing the powder of the stress light-emitting material in the light-transmissive synthetic resin material as described above. Therefore, the powder of the stress light-emitting material undergoes no fear of being disengaged from the first to fourth light-emitting projections 34, and it is possible to emit the light for a long period of time.

The ink-jet printer provided with the flow velocity detector 33 of the second embodiment is constructed equivalently to the flow velocity detector 13 and the ink-jet printer 11 of the first embodiment to provide the same or equivalent function except for the different points described above. Accordingly, the equivalent portions of the first and second embodiments are designated by the same reference numerals in the drawings, and any explanation about the equivalent portions are omitted.

FIG. 3A shows a state in which the ink 15 contained in the first ink flow passage 14a does not flow and the ink 15 stays. In this state, the first projection 23 is not deformed by the flow of the ink 15. Therefore, the first light-emitting projection 34 does not emit the light, and the light-receiving sensor 25 receives no light from the first light-emitting projection. FIG. 3B shows a state in which the ink 15 contained in the first ink flow passage 14a flows, and the first light-emitting projection 34 is deformed by the flow of the ink 15. When the flow rate of the ink 15 is changed temporally or in a time-dependent manner as when the flow of the ink is started and when the flow of the ink comes to an end, then the magnitude of the stress per unit time applied to the first light-emitting projection 34 is changed as well. In accordance therewith, the first light-emitting projection 34 emits the light, and hence the light-receiving sensor 25 can receive the light emitted by the first light-emitting projection 34.

The following method is available to manufacture the first to fourth light-emitting projections 34. That is, for example, the first to fourth light-emitting projections 34 can be formed such that a powder of the stress light-emitting material is kneaded with a light-transmissive synthetic resin material including, for example, polyethylene (PE), polypropylene (PP), polymethyl methacrylate (PMMA), polycarbonate (PC), ABS resin, and polystyrene (PS), followed by performing, for example, the injection molding.

Third Embodiment

Figure 4A:
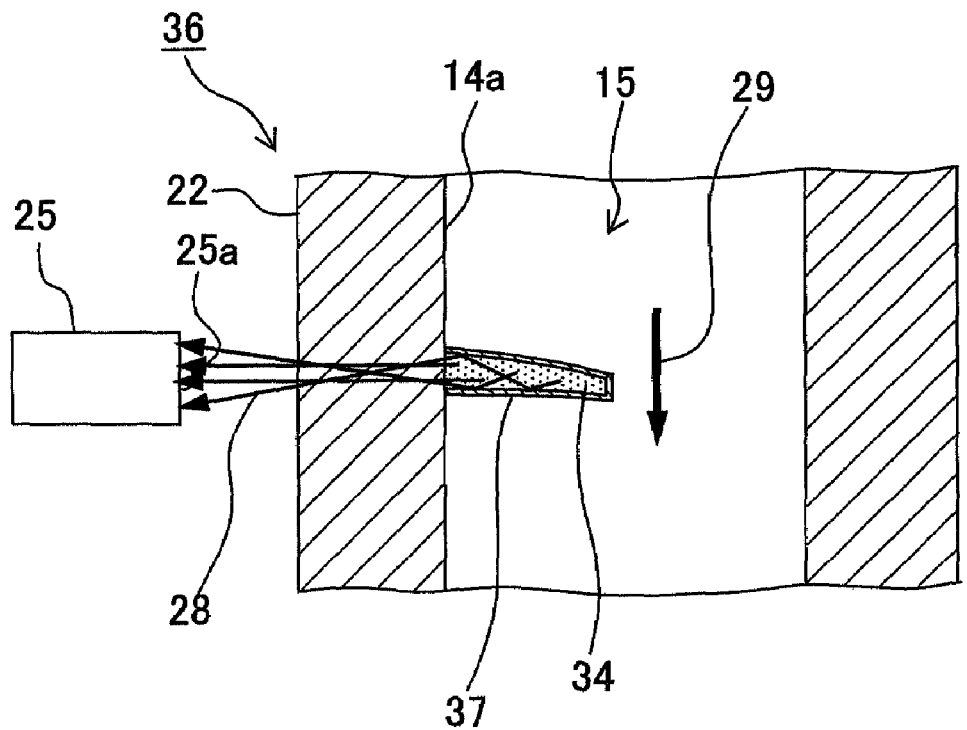
FIG. 4A relates to a flow velocity detector according to a third embodiment of the present invention, which shows a lateral sectional view illustrating a light-receiving sensor and a first light-emitting projection allowed to protrude into a first ink flow passage, and FIG. 4B relates to a flow velocity detector according to a fourth embodiment of the present invention, which shows a lateral sectional view illustrating a light-receiving sensor and a first light-emitting projection allowed to protrude into a first ink flow passage.

Next, an explanation will be made with reference to FIG. 4A about a flow velocity detector 36 according to a third embodiment of the present invention and an ink-jet printer 11 provided with the flow velocity detector 36. First to fourth light-emitting projections 34 (only the first light-emitting projection 34 is shown) of the third embodiment shown in FIG. 4A are equivalent to the first to fourth light-emitting projections 34 of the second embodiment shown in FIGS. 3A and 3B. Mirror surface layers 37 are provided on the entire surfaces of the first to fourth light-emitting projections 34 of the third embodiment respectively. A mirror surface is formed on the inner surface of the mirror surface layer 37. The mirror surface layer 37 can be formed by forming a film, for example, by means of the sputtering method, for example, with aluminum, nickel, or silver on the surface of each of the first to fourth light-emitting projections 34. Alternatively, the mirror surface layer 37 can be also formed by applying a paint containing a powder of the metal as described above. Other than the above, the third embodiment is equivalent to the second embodiment. Therefore, equivalent portions are designated by the same reference numerals in the drawing, and any explanation about the equivalent portions is omitted.

When the mirror surface layer 37 is provided on the entire surface of each of the first to fourth light-emitting projections 34, then the light 28, which is included in the light 28 emitted by each of the first to fourth light-emitting projections 34 and which is not directed to the light-receiving sensor 25 directly, can be reflected by the mirror surface layer 37, and the light 28 can be directed to the light-receiving sensor 25. Accordingly, the light 28 of each of the first to fourth light-emitting projections 34 to perform the light emission at a relatively small luminance (intensity) can be collected, and the light 28 can be received by the light-receiving sensor 25. As a result, it is possible to detect a relatively small flow velocity of the ink 15 contained in each of the first to fourth ink flow passages 14a to 14d. In place of the mirror surface layer 37, for example, a white reflective layer may be provided by using, for example, titanium oxide. The color of the reflective layer is not limited to white. The reflective layer can be formed with any arbitrary color and any arbitrary material provided that the light 28, which is included in the light 28 emitted by each of the first to fourth light-emitting projections 34 and which is not directed to the light-receiving sensor 25 directly, can be reflected and directed to the light-receiving sensor 25.

Fourth Embodiment

Figure 4B:
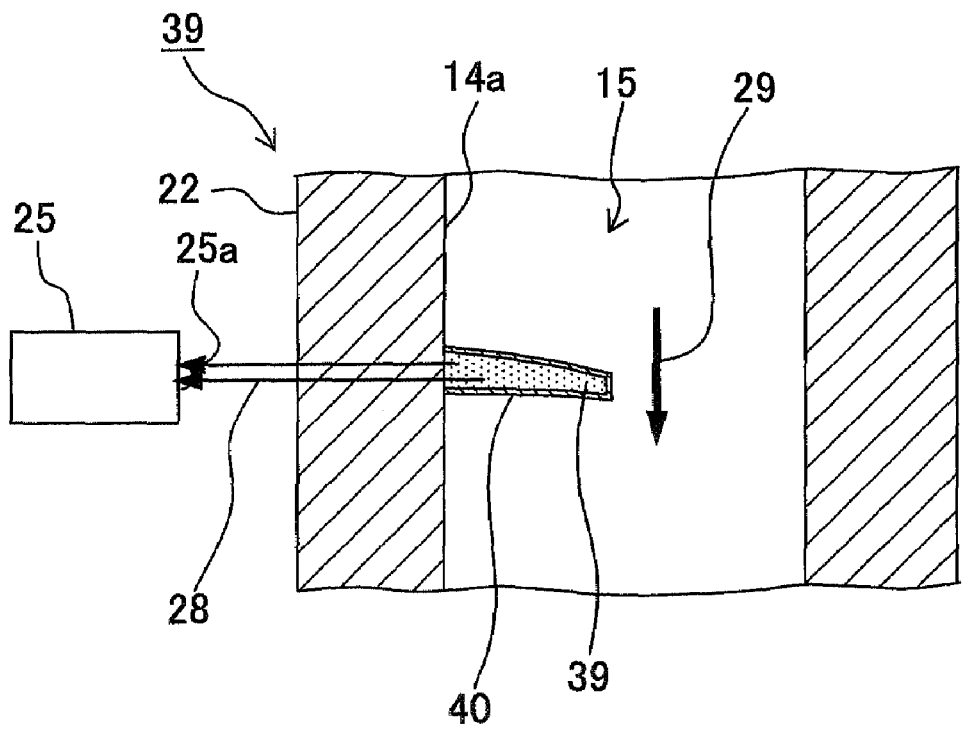

Next, an explanation will be made with reference to FIG. 4B about a flow velocity detector 39 of a fourth embodiment according to the present invention and an ink-jet printer 11 provided with the flow velocity detector 39. First to fourth light-emitting projections 34 (only the first light-emitting projection 34 is shown) of the fourth embodiment shown in FIG. 4B are equivalent to the first to fourth light-emitting projections 34 of the second embodiment shown in FIGS. 3A and 3B. Opaque layers 40 are provided on the entire surfaces of the first to fourth light-emitting projections 34 of the fourth embodiment respectively. The opaque layer 40 can be formed by applying an opaque paint to the surface of each of the first to fourth light-emitting projections 34. Other than the above, the fourth embodiment is equivalent to the second embodiment. Therefore, equivalent portions are designated by the same reference numerals in the drawing, and any explanation about the equivalent portions is omitted.

When the opaque layer 40 is provided on the entire surface of each of the first to fourth light-emitting projections 34, the light 28, which is emitted by each of the first to fourth light-emitting projections 34, cannot be radiated onto the ink 15 contained in each of the first to fourth ink flow passages 14a to 14d. It is possible to avoid, for example, any quality change of the ink 15 which would be otherwise caused, for example, by radiating the light onto the ink 15.

Fifth Embodiment

Figure 5:
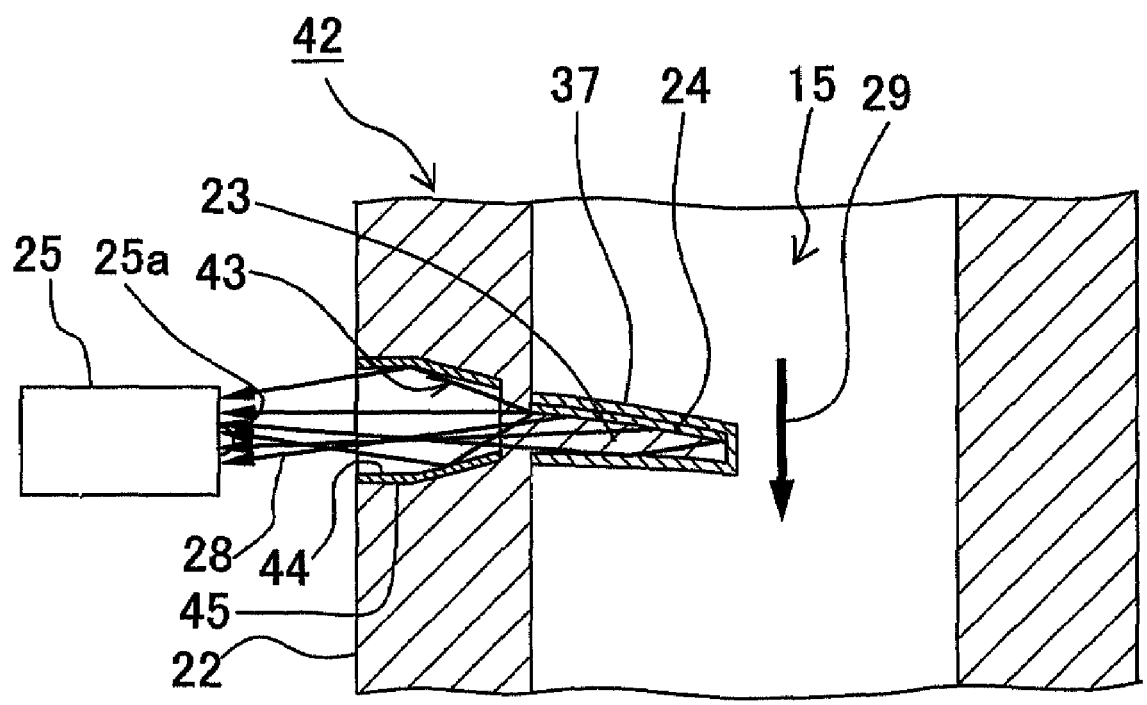
FIG. 5 relates to a flow velocity detector according to a fifth embodiment of the present invention, which shows a lateral sectional view illustrating a light-receiving sensor and a first projection provided with a stress light-emitting section allowed to protrude into a first ink flow passage.

Next, an explanation will be made about a flow velocity detector 42 of a fifth embodiment according to the present invention and an ink-jet printer 11 provided with the flow velocity detector 42. First to fourth projections 23 (only the first projection 23 is shown), which are provided with stress light-emitting sections 24 included in the fifth embodiment shown in FIG. 5, are equivalent to the first to fourth projections 23 provided with the stress light-emitting sections 24 included in the first embodiment shown in FIG. 2. Mirror surface layers 37 are formed on the entire surfaces of the first to fourth projections 23 of the fifth embodiment. An inner surface (surface opposed to the first projection 23 or the stress light-emitting section 24) of the mirror surface layer 37 is formed as a mirror surface. Each of proximal end portions of the first to fourth projections 23 included in the fifth embodiment shown in FIG. 5 is connected to a light-transmissive flow passage-forming section 22. An optical guide path 43 is formed on the outer surface of the flow passage-forming section 22, i.e., on the surface disposed on the side directed toward the light-receiving sensor 25. The optical guide path 43 is provided as follows. That is, a recess 44 is formed on the outer surface of the flow passage-forming section 22, and a mirror surface layer 45 is provided on the entire side surface of the recess 44 except for the bottom surface disposed on the side directed toward each of the first to fourth projections 23. An inner surface (surface not opposed to the flow passage-forming member 22) of the mirror surface layer 45 is formed to provide the mirror surface. Other than the above, the fifth embodiment is equivalent to the first embodiment. Therefore, equivalent portions are designated by the same reference numerals in the drawing, and any explanation about the equivalent portions is omitted.

When the mirror surface layer 37 is provided on the entire surface of each of the first to fourth projections 23 provided with the stress light-emitting sections 24 as described above, then the light 28, which is included in the light emitted by each of the stress light-emitting sections 24 of the first to fourth projections 23 and which is not directed toward the light-receiving sensor 25 directly, can be reflected by the mirror surface layer 37, and the light 28 can be directed toward the light-receiving sensor 25. Further, the light 28, which is directed toward the light-receiving sensor 25, can be allowed to pass through the optical guide path 43, and the light 28 can be directed to the light-receiving sensor 25. The optical guide path 43 makes it possible to reflect the light 28 allowed to come from the bottom surface of the recess 44 by the mirror surface layer 45 so that the light 28 is directed to the light-receiving sensor 25.

Accordingly, the light 28 of the stress light-emitting section 24 which effects the light emission at a relatively small luminance (intensity) can be collected, and the light 28 can be received by the light-receiving sensor 25. As a result, it is possible to detect a relatively small flow velocity of the ink 15 contained in each of the first to fourth ink flow passages 14a to 14d.

Sixth Embodiment

Figure 6A:
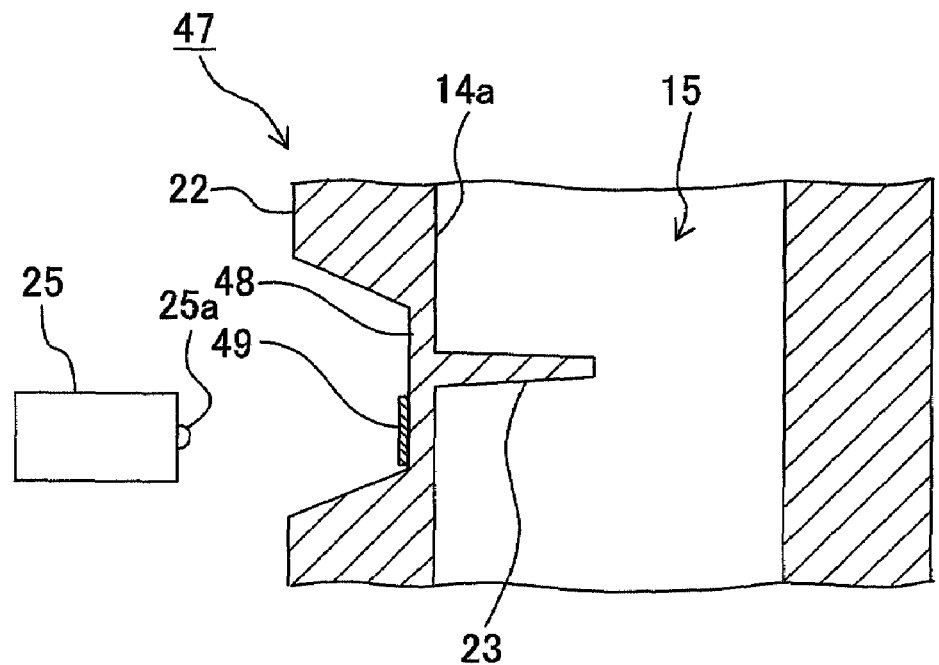
FIG. 6A relates to a flow velocity detector according to a sixth embodiment of the present invention, which shows a lateral sectional view illustrating a light-receiving sensor, a stress light-emitting section, and a first projection allowed to protrude into a first ink flow passage.
Figure 6B:
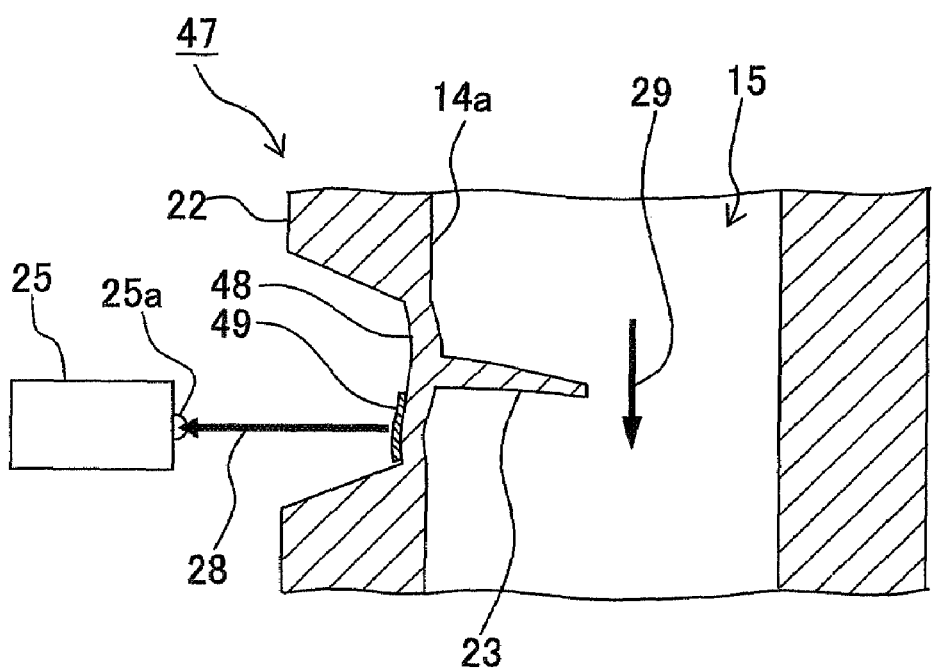
FIG. 6B shows a lateral sectional view illustrating a state in which the ink is allowed to flow as starting from FIG. 6A and the light-receiving sensor receives the light emitted by the stress light-emitting section provided on a thin-walled section.

Next, an explanation will be made with reference to FIGS. 6A and 6B about a flow velocity detector 47 of a sixth embodiment according to the present invention and an ink-jet printer 11 provided with the flow velocity detector 47. The sixth embodiment shown in FIGS. 6A and 6B is different from the first embodiment shown, for example, in FIG. 2 as follows. That is, in the first embodiment shown, for example, in FIG. 2, the light 28, which is emitted from each of the stress light-emitting sections 24 provided for the first to fourth projections 23, is transmitted through the flow passage-forming section 22 having the light-transmissive property, and the light 28 is received by the light-receiving sensor 25. On the contrary, first to fourth projections 23 (only the first projection 23 is shown) are provided on outer surfaces (surface not facing the first ink flow passage) of thin-walled sections 48 formed for flow passage-forming sections 22, stress light-emitting sections 49 are provided to have a predetermined thickness on outer surfaces of the respective thin-walled sections 48, and the light 28, which is emitted from each of the stress light-emitting sections 49, is received by the light-receiving sensor 25 in the sixth embodiment shown in FIGS. 6A and 6B. The stress light-emitting section 49 is equivalent to the stress light-emitting section of the first embodiment.

According to the sixth embodiment, as shown in FIG. 6B, for example, when the ink 15 in the first ink flow passage 14a flows, and the first projection 23 is deformed, then the thin-walled section 48 and the stress light-emitting section 49 are deformed in accordance with the deformation of the first projection 23. The stress light-emitting section 49 emits the light at a luminance (intensity) depending on the change of the deformation of the stress light-emitting section 49, and the light 28 is received by the light-receiving sensor 25.

As shown in FIGS. 6A and 6B, the respective stress light-emitting sections 49 are provided on the outer surfaces of the thin-walled sections 48. Therefore, the light 28, which is emitted from the stress light-emitting section 49, can be received by the light-receiving sensor 25 without transmitting the light 28 through the flow passage-forming section 22. Accordingly, it is possible to avoid the decrease in the luminance (intensity) which would be otherwise caused such that the light 28 emitted from the stress light-emitting section 49 is transmitted through the flow passage-forming section 22. Further, an opaque material can be used as the material for the flow passage-forming section 22. Further, the stress light-emitting section 49 makes no contact with the ink. Therefore, there is no fear of the deterioration of the stress light-emitting section 49, which would be otherwise caused, for example, by the flow of the ink or the collision with any impurity contained in the ink. In this embodiment, the first projection 23 is deformed by the stress received from the ink allowed to flow through the flow passage. However, it is not necessarily indispensable that the first projection 23 itself is deformed. In other words, even when the first projection 23 is formed of, for example, a high rigidity material, and the first projection 23 is not deformed by the stress received from the ink, then it is enough that the stress, which is received by the ink, can be transmitted to the thin-walled section 48, and the thin-walled section 48 can be deformed.

Other than the above, the flow velocity detector 47 and the ink-jet printer 11 of the sixth embodiment are constructed equivalently to the flow velocity detector 13 and the ink-jet printer 11 of the first embodiment, wherein the function is effected equivalently. Therefore, equivalent portions are designated by the same reference numerals in the drawings, and any explanation about the equivalent portions is omitted.

Seventh Embodiment

Figure 7A:
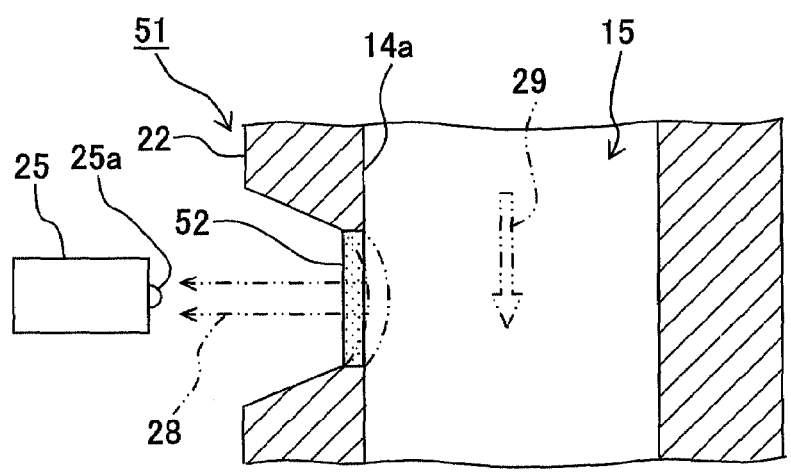
FIG. 7A relates to a flow velocity detector according to a seventh embodiment of the present invention, which shows a lateral sectional view illustrating a light-receiving sensor and a first light-emitting thin-walled section formed for a flow passage-forming section for forming a first ink flow passage, FIG. 7B relates to a flow velocity detector according to an eighth embodiment of the present invention, which shows a lateral sectional view illustrating a light-receiving sensor and a low rigidity section including a first light-emitting thin-walled section formed for a flow passage-forming section for forming a first ink flow passage, and FIG. 7C relates to a flow velocity detector according to a ninth embodiment of the present invention, which shows a lateral sectional view illustrating a light-receiving sensor and a low rigidity section including a first light-emitting thin-walled section formed for a flow passage-forming section for forming a first ink flow passage.

Next, an explanation will be made with reference to FIG. 7A about a flow velocity detector 51 of a seventh embodiment according to the present invention and an ink-jet printer 11 provided with the flow velocity detector 51. The seventh embodiment shown in FIG. 7A is different from the first embodiment shown, for example, in FIG. 2 in the following point. In the first embodiment shown, for example, in FIG. 1, the stress light-emitting sections 24 are provided for the first to fourth projections 23 as the deformation-facilitating structures respectively, and the light 28, which is emitted by each of the stress light-emitting sections 24, is received by the light-receiving sensor 25. On the contrary, in the seventh embodiment shown in FIG. 7A, first to fourth light-emitting thin-walled sections 52 as deformation-facilitating structures (only the first light-emitting thin-walled section 52 is shown) are provided for flow passage-forming sections 22, and the light 28, which is emitted by each of the first to fourth light-emitting thin-walled sections 52, is received by the light-receiving sensor 25.

According to the seventh embodiment, as shown in FIG. 7A, for example, when the ink 15 in the first ink flow passage 14 flows, and the first light-emitting thin-walled section 52 is deformed inwardly, then the first light-emitting thin-walled section 52 emits the light at a luminance (intensity) corresponding to the change of the deformation, and the light is received by the light-receiving sensor 25.

The first to fourth light-emitting thin-walled sections 52 can be manufactured in the same manner as the first to fourth light-emitting projections 34 of the second embodiment. That is, each of the first to fourth light-emitting thin-walled sections 52 can be formed by mixing and dispersing a powder of the stress light-emitting material in a synthetic resin material having the light-transmissive property. In other words, the first to fourth light-emitting thin-walled sections 52 themselves are the stress light-emitting sections, and the stress light-emitting sections are formed as the deformation-facilitating structures.

Other than the above, the flow velocity detector 51 and the ink-jet printer 11 of the seventh embodiment are constructed equivalently to the flow velocity detector 13 and the ink-jet printer 11 of the first embodiment, wherein the function is effected equivalently. Therefore, equivalent portions are designated by the same reference numerals in the drawing, and any explanation about the equivalent portions is omitted.

Eighth Embodiment

Figure 7B:
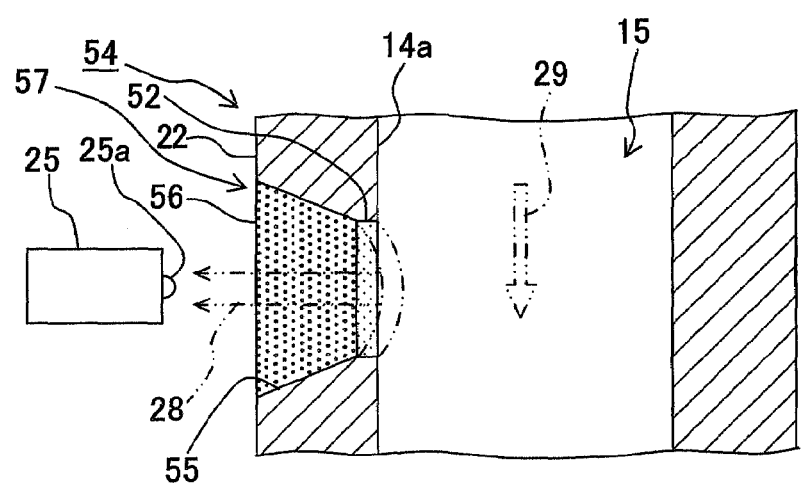

Next, an explanation will be made with reference to FIG. 7B about a flow velocity detector 54 of an eighth embodiment according to the present invention and an ink-jet printer 11 provided with the flow velocity detector 54. First to fourth light-emitting thin-walled sections 52 (only the first light-emitting thin-walled section 52 is shown) of the eighth embodiment shown in FIG. 7B are equivalent to those of the seventh embodiment shown in FIG. 7A. The first to fourth light-emitting thin-walled sections 52 are formed by bottom walls of recesses 55 provided on outer surfaces of flow passage-forming sections 22 for forming the first to fourth ink flow passages 14a to 14d respectively. A soft member 56, which is composed of, for example, a synthetic resin foam such as epoxy resin having the light-transmissive property, is provided and secured in each of the recesses 55. The soft member 56 and each of the first to fourth light-emitting thin-walled sections 52 constitute a low rigidity section 57 as a form of the deformation-facilitating structure.

According to the eighth embodiment, as shown in FIG. 7B, for example, when the ink 15 contained in the first ink flow passage 14a is allowed to flow, and the first light-emitting thin-walled section 52 is deformed inwardly, then the first light-emitting thin-walled section 52 emits the light at a luminance (intensity) corresponding to the change of the deformation, and the light is received by the light-receiving sensor 25.

Other than the above, the flow velocity detector 54 and the ink-jet printer 11 of the eighth embodiment are constructed equivalently to the flow velocity detector 51 and the ink-jet printer 11 of the seventh embodiment, wherein the function is effected equivalently. Therefore, equivalent portions are designated by the same reference numerals in the drawing, and any explanation about the equivalent portions is omitted.

Ninth Embodiment

Figure 7C:
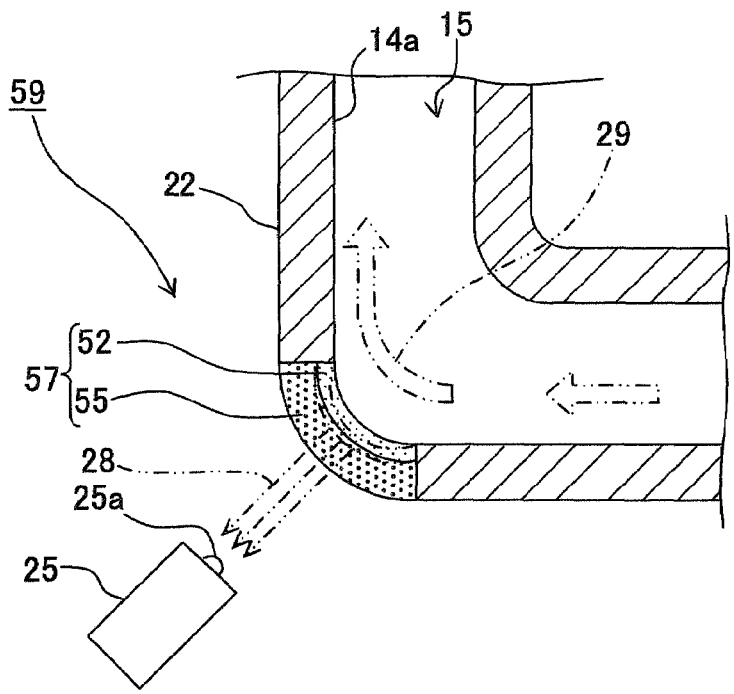

Next, an explanation will be made with reference to FIG. 7C about a ninth embodiment of a flow velocity detector 59 and an ink-jet printer 11 provided with the flow velocity detector 59 according to the present invention. First to fourth light-emitting thin-walled sections 52 (only the first light-emitting thin-walled section 52 is shown) and respective low rigidity sections 57 provided with soft members 56 of the ninth embodiment shown in FIG. 7C are equivalent to those of the eighth embodiment. However, the low rigidity section 57 of the ninth embodiment is provided at each of outer portions of respective flow passage-forming sections 22 for forming bent portions of first to fourth ink flow passages 14a to 14d.

According to the ninth embodiment, as shown in FIG. 7C, for example, when the ink 15 in the first ink flow passage 14a flows, and the first light-emitting thin-walled section 52 is deformed outwardly, then the first light-emitting thin-walled section 52 emits the light at a luminance (intensity) corresponding to the change of the deformation, and the light 28 is received by the light-receiving sensor 25.

Other than the above, the flow velocity detector 59 and the ink-jet printer 11 of the ninth embodiment are constructed equivalently to the flow velocity detector 54 and the ink-jet printer 11 of the eighth embodiment, wherein the function is effected equivalently. Therefore, equivalent portions are designated by the same reference numerals in the drawing, and any explanation about the equivalent portions is omitted.

In the embodiments described above, the flow velocity detector 13 is applied to the ink-jet printer 11. However, the flow velocity detector 13 is applicable to any equipment other than the ink-jet printer 11. Also in this case, the flow velocity detector 13 is capable of detecting the flow velocity of the fluid including, for example, the liquid such as the ink 15, the gas, the liquid powder, or the aerosol.

In the embodiments described above, the stress light-emitting section 24 is provided and/or the stress light-emitting material is applied with respect to each of the first to fourth projections 23, the first to fourth light-emitting projections 34, and the first to fourth light-emitting thin-walled sections 52 as the deformation-facilitating structures. However, in place thereof, although not shown in the drawings, it is not necessarily indispensable that the deformation-facilitating structure as described above is provided. For example, the stress light-emitting section 24 may be provided at any place at which the stress is exerted on the stress light-emitting section 24 resulting from the flow of the ink, including, for example, the inner surface, the outer surface, or the inside of the flow passage-forming section 22. Further, it is not necessarily indispensable that the cross-sectional shape of the ink flow passage (cross-sectional shape in the plane perpendicular to the direction of the flow of the ink) is circular. The ink flow passage may be formed to have, for example, a circular tube-shaped form. The ink flow passage may be formed such that a groove, which is formed on a plate member, for example, by means of the etching, is covered with a resin film or the like.

In the embodiments described above, each of the first to fourth projections 23, each of the first to fourth light-emitting projections 34, and each of the first to fourth light-emitting thin-walled sections 52 are arranged one by one for each of the first to fourth ink flow passages 14a to 14d. However, in place thereof, a plurality of them may be arranged in each of the ink flow passages 14a to 14d.

Further, in the embodiments described above, one light-receiving sensor 25 is used to detect the flow velocities of the inks 15 contained in the first to fourth ink flow passages 14a to 14d. However, in place thereof, the following arrangement is also available. That is, four of the light-receiving sensors in total may be provided one by one for the first to fourth ink flow passages 14a to 14d respectively, and the flow velocities of the inks 15 in the first to fourth ink flow passages 14a to 14d may be detected by means of the light-receiving sensors provided corresponding to the respective flow passages. Further, in the first to ninth embodiments described above, the flow velocities of the inks 15 flowing through the respective ink flow passages are measured in order to detect whether or not the inks flow normally in the purge operation. However, the present invention is not limited to only this way of use. The present invention is usable in order to detect the flow velocity of the fluid such as the ink in any arbitrary way of use.

In the embodiments described above, the light-receiving sensor is fixed to the side wall of the main body of the ink-jet printer. When the head unit is moved to each of the first to fourth maintenance positions, the light-receiving section is positioned over or above each of the first to fourth projections. However, the present invention is not limited thereto. For example, the light-receiving sensor may be arranged at a predetermined position of the main body of the ink-jet printer, and the light, which is emitted from the stress light-emitting section, may be guided to the light-receiving sensor by using an optical guide path such as an optical fiber. In this arrangement, it is unnecessary to arrange the light-receiving sensor at the position at which the light, which is emitted from the stress light-emitting section, can be directly received. The degree of freedom of the arrangement of the light-receiving sensor is enhanced. In place of the arrangement in which the head unit is moved to each of the first to fourth maintenance positions to receive the light emitted from the stress light-emitting section at the light-receiving sensor or one end of the optical guide path as described above (hereinafter referred to as "light-receiving sensor or the like"), the light-receiving sensor (or one end of the optical guide path as described above) may be made movable, and thus the light-receiving sensor or the like may be moved to a position at which the light emitted from the stress light-emitting section can be directly received. Alternatively, when the position of the head and the position of the stress light-emitting section are fixed as in a line head, the light-receiving sensor or the like may be arranged and fixed at a position at which the light from the stress light-emitting section can be received.

As described above, the flow velocity detector according to the present invention and the ink-jet printer provided with the flow velocity detector have the simple structures and the small sizes. The excellent effect is provided such that the flow velocity of the fluid can be detected at the low cost. The present invention is appropriate to be applied to the flow velocity detector as described above and the ink-jet printer provided with the flow velocity detector.

What is claimed is:

1. A flow velocity detector which detects a flow velocity of a fluid flowing through a flow passage, the flow velocity detector comprising:
   a flow passage-forming section which defines the flow passage;
   a stress light-emitting section which is arranged at the flow passage-forming section to receive a stress having a magnitude depending on the flow velocity of the fluid and which emits a light of which amount corresponds to a change caused by the received stress; and
   a light-receiving sensor which receives the light emitted by the stress light-emitting section,
   wherein the flow velocity of the fluid is detected based on an amount of the light received by the light-receiving sensor to generate a detection signal.

2. The flow velocity detector according to claim 1, further comprising a deformation-facilitating structure which is formed on the flow passage-forming section and which is deformable at a magnitude depending on the flow velocity of the fluid, wherein the deformation-facilitating structure is provided with the stress light-emitting section.

3. The flow velocity detector according to claim 2, wherein the deformation-facilitating structure has a protrusion which protrudes into the flow passage, or a thin-walled section or a low rigidity section which is formed in the flow passage-forming section.

4. The flow velocity detector according to claim 2, wherein the stress light-emitting section has a sheet shape, and the stress light-emitting section is arranged on a surface of the deformation-facilitating structure.

5. The flow velocity detector according to claim 4, wherein the surface of the deformation-facilitating structure, on which the stress light-emitting section is arranged, is positioned inside the flow passage.

6. The flow velocity detector according to claim 4, wherein the surface of the deformation-facilitating structure, on which the stress light-emitting section is arranged, is positioned outside the flow passage.

7. The flow velocity detector according to claim 2, wherein the stress light-emitting section is formed integrally with the deformation-facilitating structure.

8. The flow velocity detector according to claim 2, wherein a surface of the stress light-emitting section, which faces the flow passage, is covered with a reflective layer which reflects the light emitted from the stress light-emitting section.

9. The flow velocity detector according to claim 2, wherein a surface of the stress light-emitting section, which faces the flow passage, is covered with an opaque layer through which the light emitted from the stress light-emitting section is not transmitted.

10. The flow velocity detector according to claim 1, wherein a part of the flow passage-forming section, through which the light is transmitted, is formed of a light-transmissive material such that the light emitted by the stress light-emitting section arrives at the light-receiving sensor.

11. The flow velocity detector according to claim 10, wherein a surface of the stress light-emitting section which faces the flow passage and a surface of the part of the flow passage-forming section which is formed of the light-transmissive material are covered with a reflective layer which reflects the light emitted from the stress light-emitting section.

12. An ink-jet printer comprising the flow velocity detector as defined in claim 1, wherein the fluid is an ink.

13. The ink-jet printer according to claim 12, wherein the flow passage is formed as a plurality of flow passages, and the flow passage-forming section has a plurality of individual flow passage-forming sections each of which defines one of the flow passages;
   the stress light-emitting section includes a plurality of individual stress light-emitting sections each of which is arranged at one of the individual flow passage-forming sections;
   the light-receiving sensor includes a single light-receiving sensor; and the flow velocity detector successively receives lights emitted from the respective individual stress light-emitting sections by the single light-receiving sensor to detect flow velocity of the fluid in each of the flow passages.

14. The ink-jet printer according to claim 13, further comprising a movable section which movably supports the plurality of individual flow passage-forming sections having the individual stress light-emitting sections arranged therein, wherein the single light-receiving sensor is fixed at a predetermined position; and the movable section is moved so that the lights successively emitted by the plurality of individual stress light-emitting sections are successively received by the single light-receiving sensor and that the flow velocity of the fluid in each of the respective flow passages is detected.

* * * * *